United States Patent
Schleiffarth (12) 
(10) Patent No.: US 6,365,005 B1
(45) Date of Patent: Apr. 2, 2002

(54) APPARATUS AND METHOD FOR VAPOR COMPRESSION DISTILLATION

(76) Inventor: James W. Schleiffarth, 7740 Sagebrush Dr., Atlanta, GA (US) 30350

( * ) Notice: Subject to any disclaimer, the term of this patent is extended or adjusted under 35 U.S.C. 154(b) by 0 days.

(21) Appl. No.: 09/247,465

(22) Filed: Feb. 9, 1999

Related U.S. Application Data (63) Continuation-in-part of application No. 09/013,343, filed on Jan. 26, 1998, now abandoned.
(60) Provisional application No. 60/074,099, filed on Feb. 9, 1998, and provisional application No. 60/036,284, filed on Jan. 27, 1997.

(51) Int. Cl.[7] .................................................. B01D 3/42
(52) U.S. Cl. ........................... 203/1; 159/24.1; 159/44; 159/47.1; 159/901; 202/172; 202/173; 202/181; 202/182; 202/175; 202/265; 203/24; 203/26; 203/27; 203/71; 203/98; 203/10
(58) Field of Search ................................. 203/24, 10, 1, 203/26, 98, 71, 27; 202/172, 182, 185.1, 181, 173, 265, 175; 159/901, 900, DIG. 40, 24.1, 24.3, 27.1, 47.1, DIG. 3, 44, 25.1, 25.2; 165/13, 65

(56) References Cited

U.S. PATENT DOCUMENTS

| | | | | |
|---|---|---|---|---|
| 2,091,898 A | * | 8/1937 | Weber | 159/901 |
| 3,192,130 A | * | 6/1965 | Pottharst, Jr. | 159/901 |
| 3,933,576 A | * | 1/1976 | Rushton | 159/27.1 |
| 4,548,257 A | * | 10/1985 | Williamson | 165/113 |
| 4,566,947 A | * | 1/1986 | Tsuruta | 203/26 |
| 5,250,151 A | * | 10/1993 | Hurcanos | 159/27.1 |
| 5,474,653 A | * | 12/1995 | Bostjancic | 159/44 |
| 5,587,054 A | * | 12/1996 | Keith | 202/205 |
| 5,858,177 A | * | 1/1999 | Morris | 203/26 |
| 6,191,302 B1 | * | 2/2001 | Nishihira et al. | 558/488 |

FOREIGN PATENT DOCUMENTS

WO 98/31445 * 7/1998

* cited by examiner

*Primary Examiner*—Virginia Manoharan
(74) *Attorney, Agent, or Firm*—Patent Law Offices of Albert S. Anderson (57) ABSTRACT

An improved design of a vapor compression distiller which makes use of a rapid, highly turbulent flow through the heat-of-evaporation recovery, or primary, heat exchanger. The distiller may also include the use of turbulators to increase turbulence and mixing within the primary heat exchanger. The increased level of turbulence and mixing dramatically reduces fouling inside the primary heat exchanger and increases the heat transfer efficiency. The improvements in the distiller are maximized by recirculating the liquid to be evaporated at a high multiple of the flow rate of the liquid feed to the distiller. The distiller may also include a feed circulation loop with a secondary heat exchanger to increase the efficiency of heat-of-evaporation recovery in the evaporation/condensation cycle. Applications of the vapor compression distiller include purification of waste liquids, concentration of dilute liquid mixtures, and separation of liquid/liquid, liquid/gas, and liquid/solid mixtures.

5 Claims, 12 Drawing Sheets

APPARATUS AND METHOD FOR VAPOR COMPRESSION DISTILLATION

This application is a continuation-in-part of U.S. patent application Ser. No. 09/013,343, filed Jan. 26, 1998, abandoned, on behalf of the same inventor and claims benefit of Prov. No's 60/036,284 filed Jan. 27, 1997 and 60/074,099 filed Feb. 9, 1998.

FIELD OF INVENTION

This invention relates to distillation equipment and processing, specifically an improved design for a vapor compression distillation apparatus and method.

BACKGROUND

Vapor compression distillation has the potential to provide significant savings in capital and operating costs over single or multiple effect evaporators not using this technology. Vapor compression distillation is typically limited in application by economics and operational problems.

Vapor compression distillers of various designs have been proposed for many years. Most of these designs have seen little or no commercial use due to both functional problems and for economic reasons. The commercial feasibility for these previous designs is strongly affected by many factors. The exact disadvantages of earlier designs are varied and include poor heat transfer, fouling tendencies, poor or inflexible application of makeup heat for thermal losses, poor equipment reliability, higher operating costs, inflexibility in liquid flows, higher maintenance costs, higher initial capital costs, difficulty in system startup, and lack of flexibility in processing capacity.

SUMMARY OF THE INVENTION

Briefly described, the invention is vapor compression distillation apparatus and process. A liquid is circulated through an evaporation loop comprising an evaporation vessel in fluid communication with a first side of a primary heat exchanger. The liquid is boiled to produce a vapor. The vapor is passed through a vapor compressor to a second side of the primary heat exchanger so as to condense at least a portion of said vapor. Additional amounts of the liquid are introduced at a feed rate so as to maintain approximately the same volume of liquid in the evaporation loop. The liquid is recirculated at a recirculation rate of 25 to 200 times the feed rate.

The invention is also a two-loop vapor compression distiller. The major components of the invention are a primary heat exchanger having a first side thereof which facilitates heat flow to a second side thereof, an evaporation vessel for boiling a liquid and collecting the vapor of the liquid in the upper portion of the evaporation vessel, a vapor compressor communicating with the upper portion of the evaporation vessel and with an inlet to the first side of the primary heat exchanger, and a recirculation pump. There is also an evaporation loop providing fluid communication from the evaporation vessel through the recirculation pump and through the second side of the primary heat exchanger and back to the evaporation vessel, a means for boiling the liquid within the evaporation loop, a transfer line for supplying the liquid to the evaporation loop at a feed rate, a secondary heat exchanger having a first side thereof which facilitates heat flow to a second side thereof, a condensate line for providing fluid communication between an outlet of the first side of the primary heat exchanger and an inlet of the first side of the secondary heat exchanger, a feed pump, a feed loop providing fluid communication from the feed pump through the second side of the secondary heat exchanger to the transfer line and back to the feed pump, and a feed line for supplying the liquid at the feed rate to the feed loop.

Accordingly, several objects and advantages of the invention are to provide a vapor compression distiller which addresses the disadvantages of prior vapor compression distillers. These include improved heat transfer by rapid turbulent flow of liquid through the inside of the heat exchanger provided by one or more high volume recirculation pumps, and optionally the use of turbulence enhancing devices (turbulators) inside the heat exchanger which increases the liquid turbulence at the inside walls and dramatically reduces or stops fouling, increased flexibility of addition of makeup heat by providing for the addition of steam to compensate for thermal losses in either the recirculating liquid, the heat exchanger, or the vessel, as well as use of a heat exchanger between the condensate liquid and the feed liquid to recover heat from the hot condensate. Variable system feed rates are addressed by use of a system idle function which allows the system to maintain operating temperatures and rapidly and automatically continue operation when the system feed again resumes. This simple, reliable design allows for easier system operation and reduced maintenance, as well as reduced time required for cleaning of the heat exchanger in high fouling environments.

Still further objects and advantages will become apparent from a consideration of the ensuing description and accompanying drawings.

DESCRIPTION OF THE PREFERRED EMBODIMENTS

Figure 1:
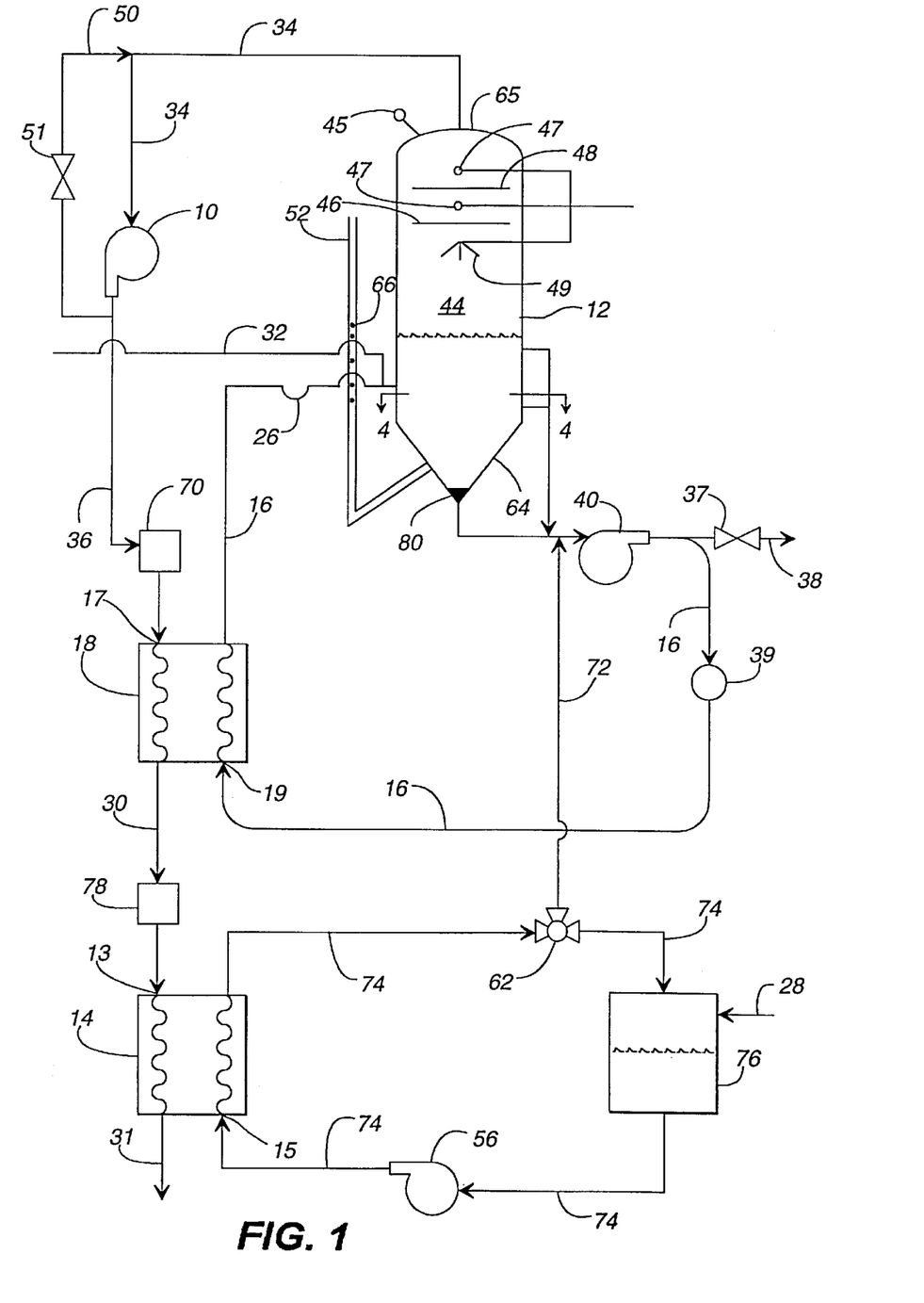
FIG. 1 is a block diagram showing the major components of a preferred embodiment of the invention.
Figure 2A:
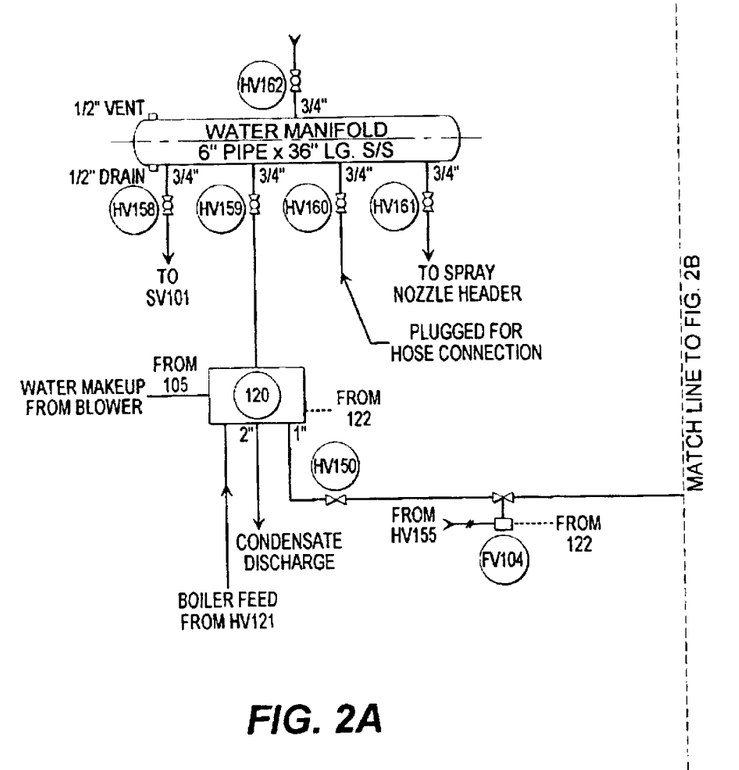
FIGS. 2A–2H are a composite showing a full-size process and instrumentation drawing of a preferred embodiment of the invention.
Figure 2B:
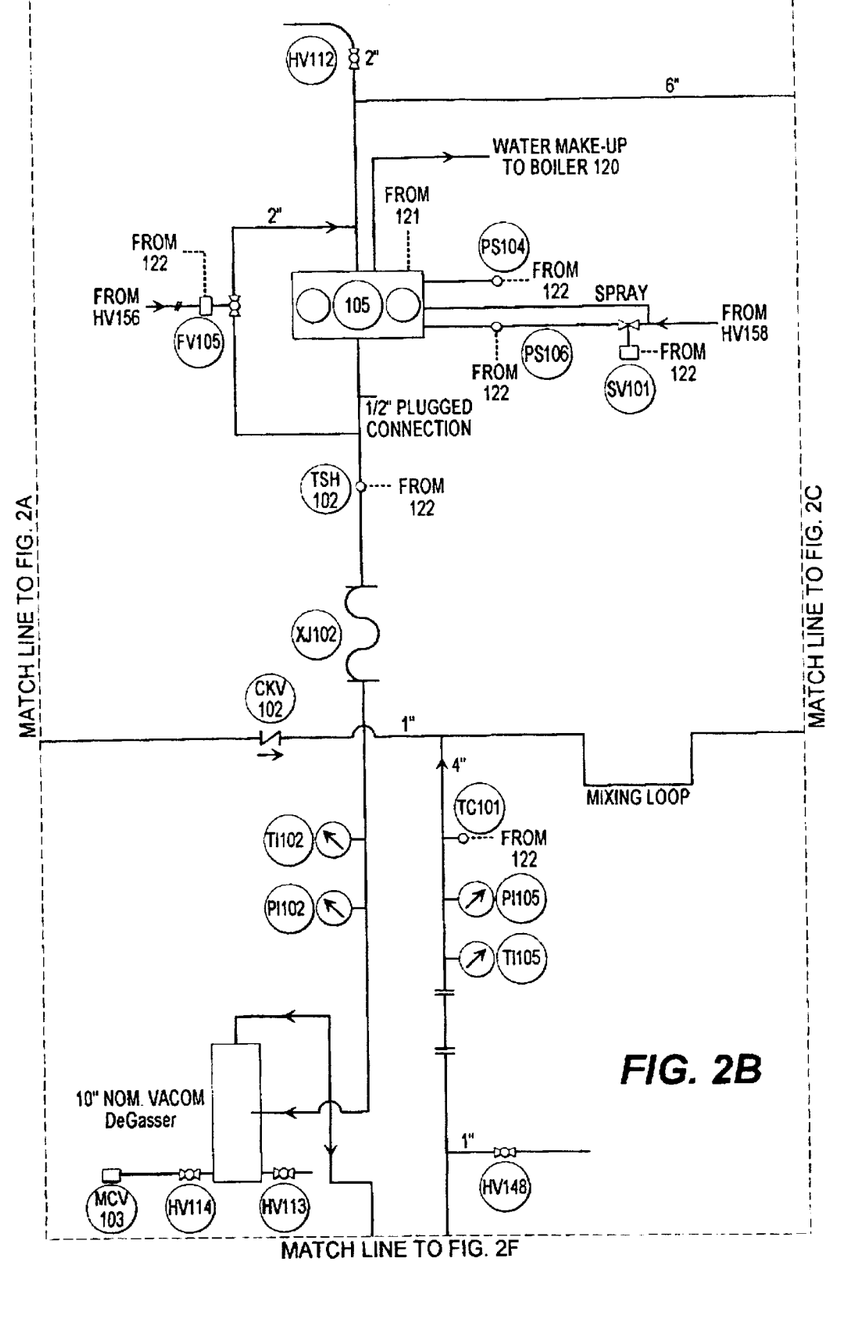
Figure 2C:
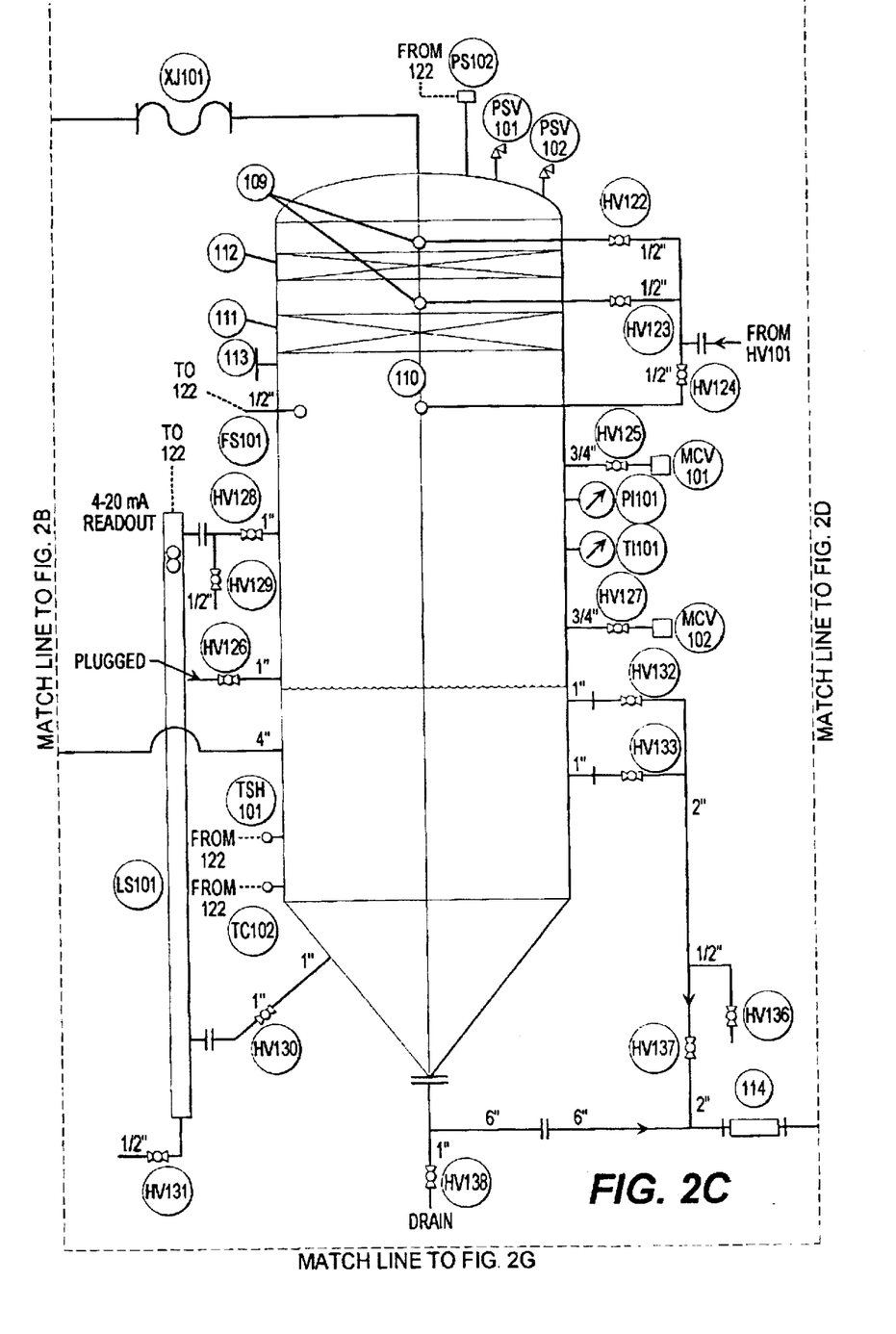
Figure 2D:
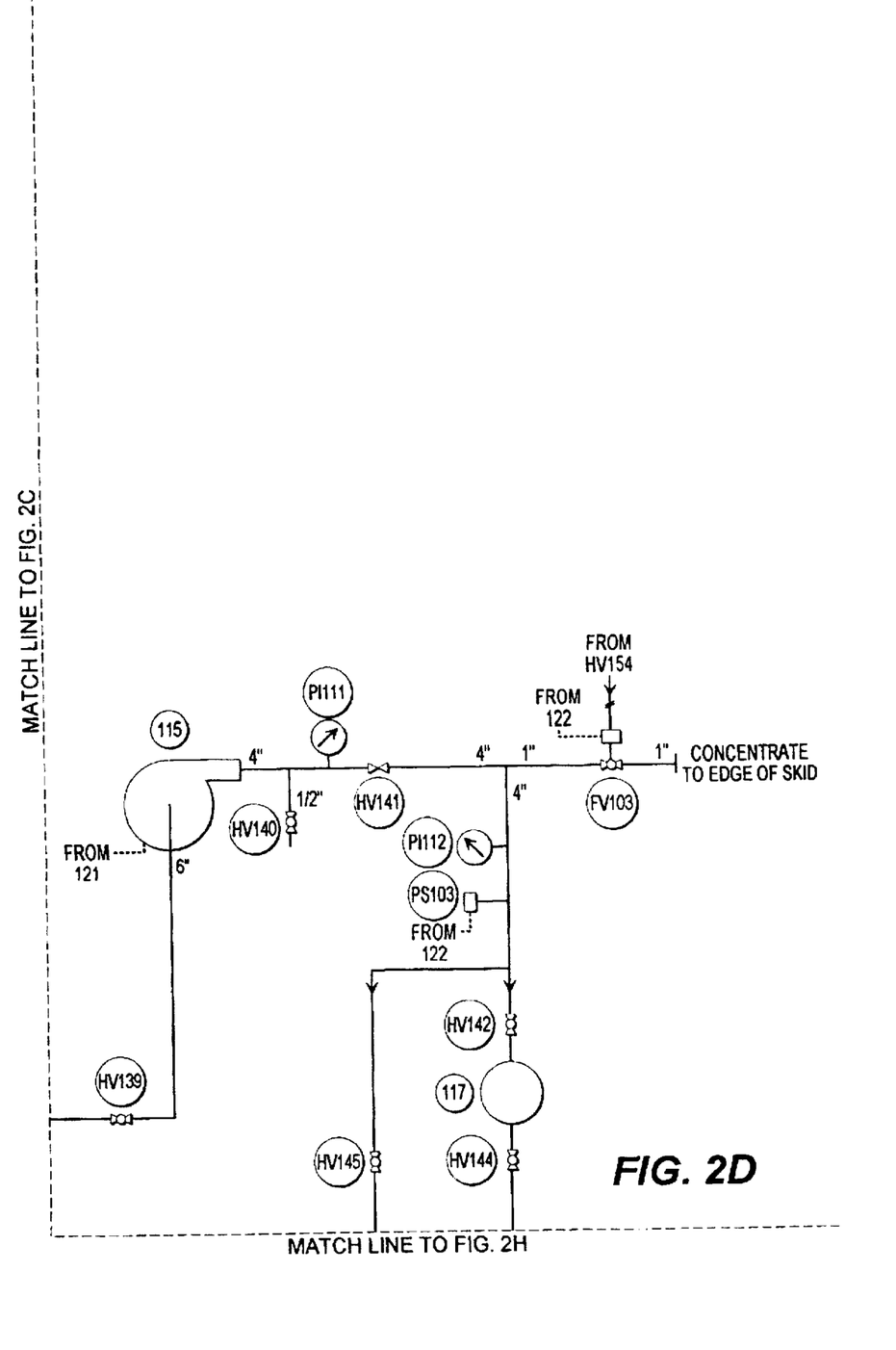
Figure 2E:
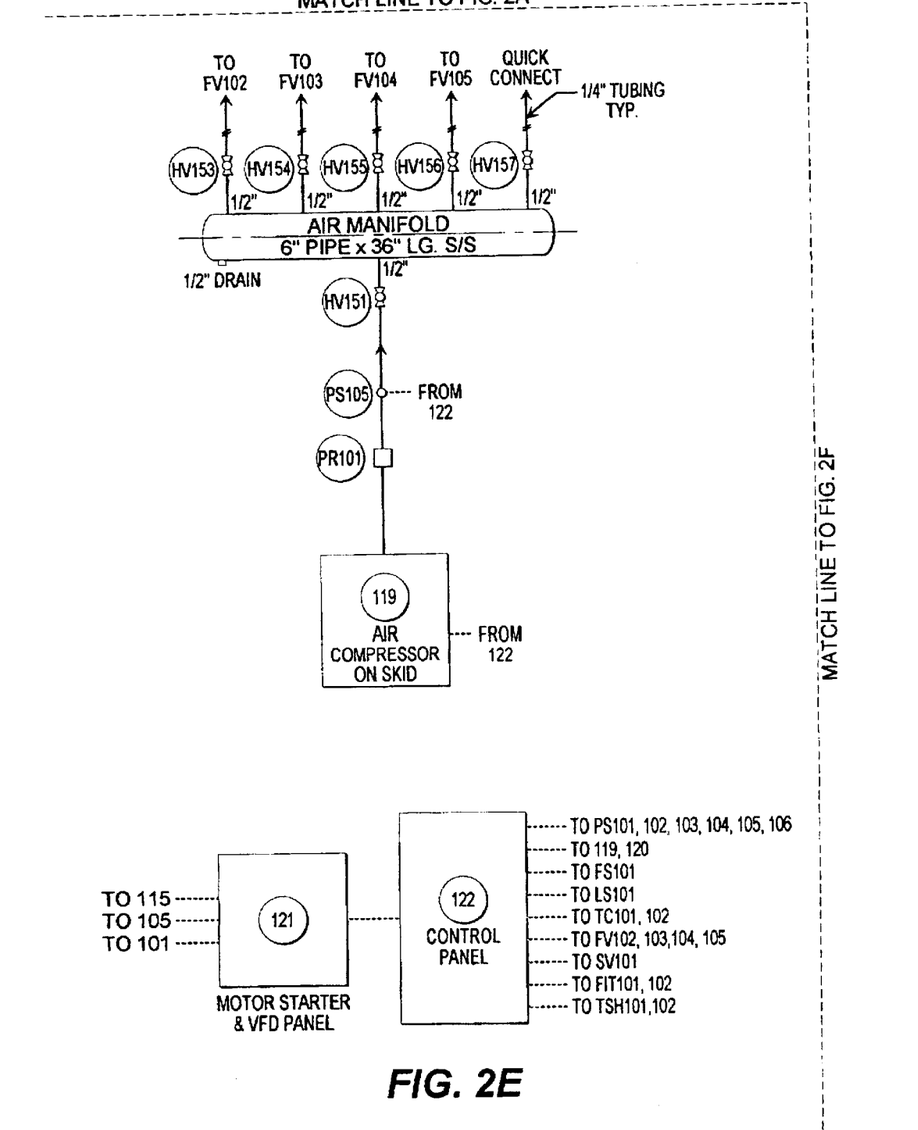
Figure 2F:
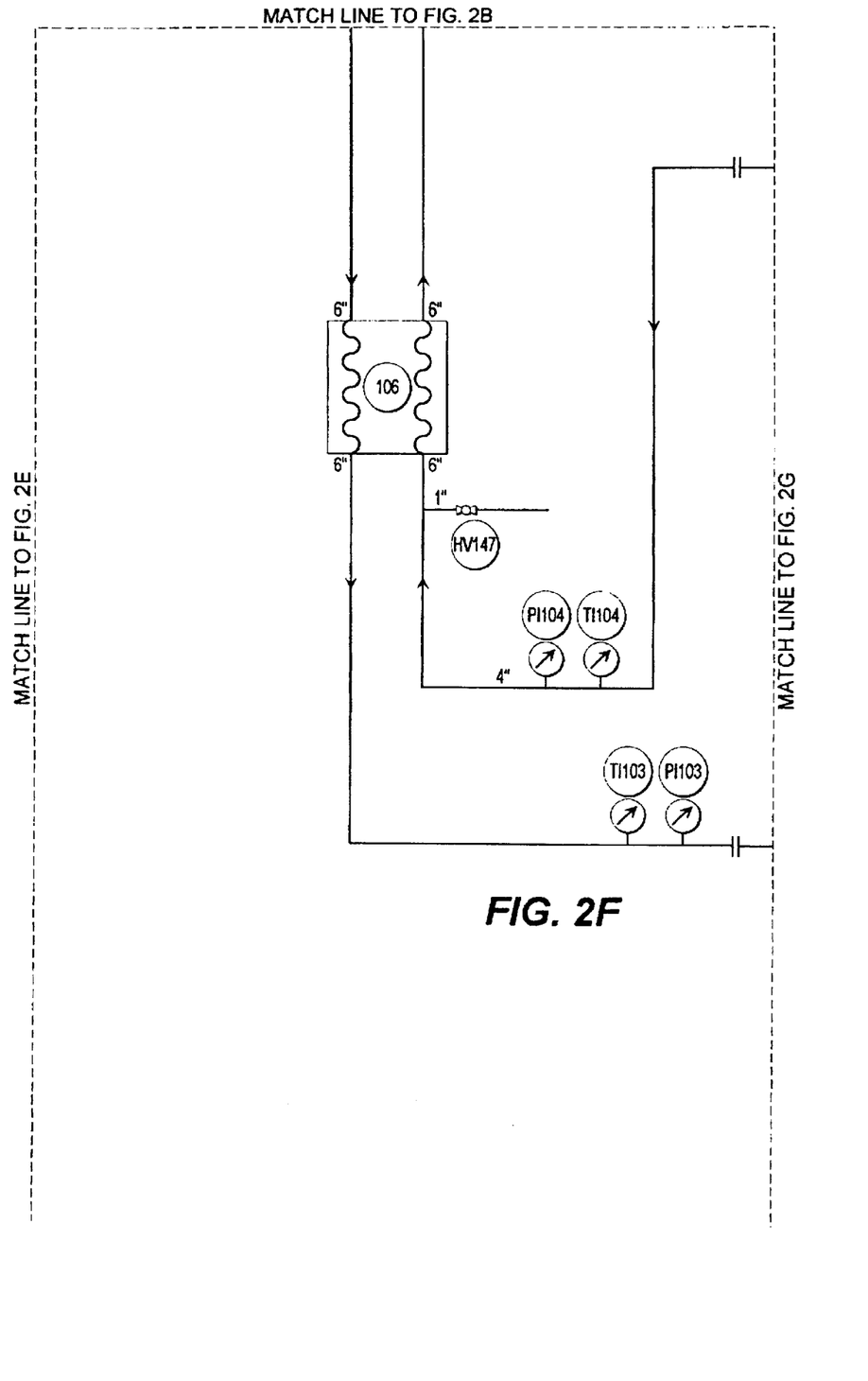
Figure 2G:
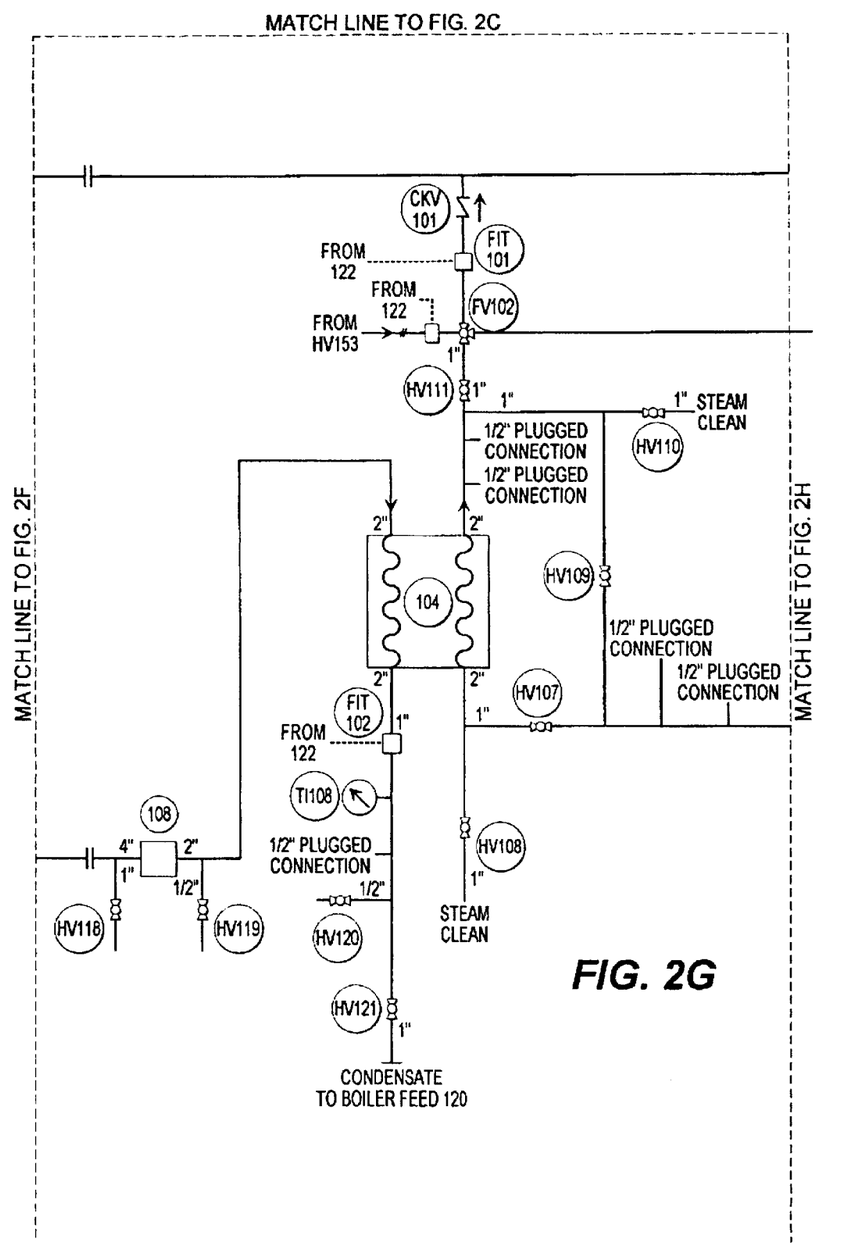
Figure 2H:
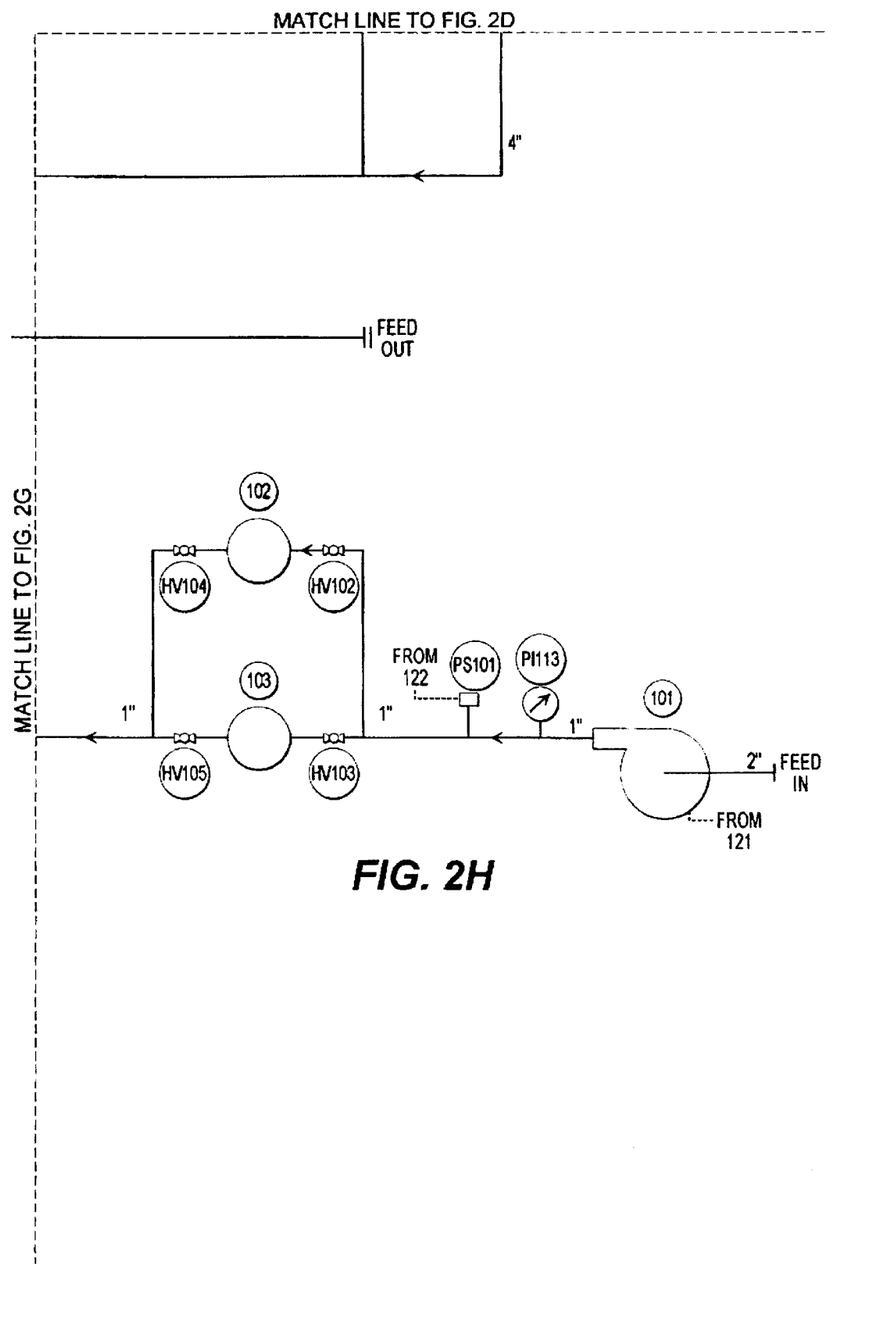

Structure. FIG. 1 shows the major components of the structure of the invention. The distiller comprises two main liquid circulation loops, the feed loop and the evaporation loop. The feed loop circulates a feed liquid to be evaporated. The evaporation loop includes an evaporation vessel 12 in the form of a cylindrical tank. The top of the evaporation vessel 12 is connected by a vapor compression inlet line 34 to a blower or compressor 10. The blower bypass line 50 bypasses the blower or compressor 10 when valve 51 is open. The compressor 10 provides a method for compressing the vapor that forms when a liquid in the evaporation vessel 12 boils. A vapor compression outlet line 34 exits the blower or compressor 10 to connect with a hot inlet 17 of a primary heat exchanger 18. Optionally, a degasser 70 may be inserted in the vapor compression outlet line 36 to remove non-compressible gases that may be present in the vapor. A condensate line 30 exits the primary heat exchanger 18 to connect with a hot inlet 13 of a secondary heat exchanger 14. A condensate outlet line 31 exits the secondary heat exchanger 14 to provide distillate from the distiller. Optionally, the condensate line 30 may be connected directly to the condensate outlet line 31, eliminating the secondary heat exchanger 14.

A feed inlet line 28 allows liquid feed to enter the vapor compression distiller either directly into the feed loop 74 or into a feed holding tank 76. The feed loop 74 is pumped by feed pump 56 and passes through the cold side of the secondary heat exchanger 14 and back around to the feed holding tank 76. A portion of the feed liquid can be bled off through a valve 62 into the evaporation loop 16 via a transfer line 72. A level control (not shown) operating off a level sensing device 66 in a level well 52 allows a feed rate to be set sufficient to maintain approximately the same volume of liquid in the evaporation vessel. Optionally, the return portion of the feed loop downstream of the valve 62 can be eliminated by setting valve 62 to pass all of the liquid feed to the evaporation loop 16 and controlling the feed pump rate.

The evaporation loop 16 allows the liquid feed to circulate and be heated to boiling by the heat of make-up steam and the heat recovered by condensing the vapor in the primary heat exchanger 18. The evaporation loop 16 exits the evaporation vessel 12 and passes through a high-speed recirculation pump 40. A portion of the liquid circulating in the evaporation loop 16 may be bled off through a valve 37 into a concentrate outlet 38. The evaporation loop 16 passes through a self-cleaning strainer 39 and into the cold inlet 19 of the primary heat exchanger 18. The evaporation loop 16 exits the primary heat exchanger 18 and passes through a mixing loop 26 and returns into the evaporation vessel 12. The evaporation loop 16 is connected in a tangential manner to the periphery of the evaporation vessel 12 so that a swirling, vortex action is induced by the entry of the circulating liquid into the evaporation vessel 12.

Makeup steam from a boiler (not shown) or external source is provided to initiate operation of the evaporator and to provide for heat losses due to incomplete recovery of the heat of evaporation in the primary heat exchanger 18. A makeup steam line 32 feeds into the evaporation loop 16 or into the vessel through a sparger (not shown).

The evaporation vessel 12 contains a vapor disengagement section 44 above the level of the liquid being evaporated. Optionally, full spray nozzles 49 spray liquid feed or other suitable liquid (such as process water) into the vapor disengagement section to assist the disengagement of the vapor from mist and other liquid droplets. Mist eliminators 46, 48 with clean-in-place nozzles 47 are placed above the full spray nozzles 49. The vapor compressor inlet line 34 is between the blower or compressor 10 and the top of the evaporation vessel 12. The evaporation vessel has a closed top 65 and a closed bottom 64, each of which may be generally of any shape. In applications where the feed contains precipitates or solids (such as wastewater), the closed bottom 64 may have a conical shape to facilitate sliding of the solids to the concentrate outlet line 38. If the bottom is conical, a preferred shape is a cone having an interior cross-section angle of 60 degrees.

The composite drawing shown in FIGS. 2A–2H is a process and instrumentation drawing of a major embodiment of this system. The alphanumeric tags in this drawing are provided by Table 1.

Figure 3:
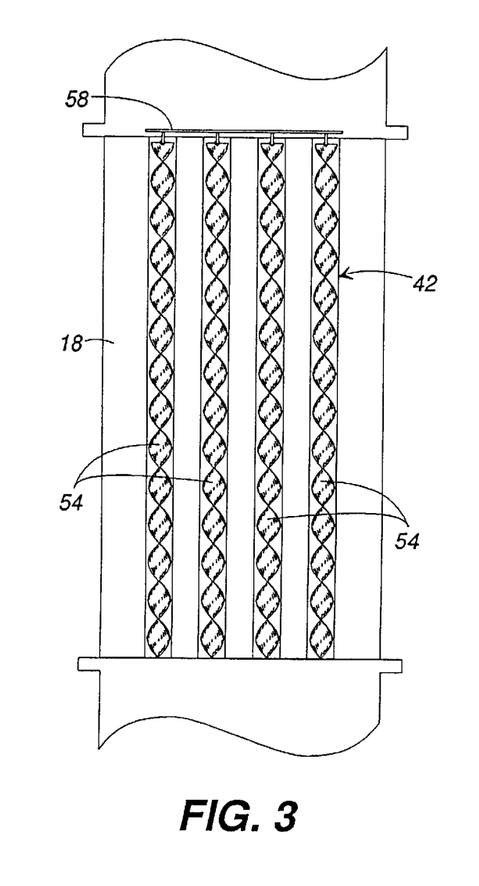
FIG. 3 is a elevation-view diagram showing the location of the turbulence-enhancing devices inside the tubes of a shell-and-tube primary heat exchanger.

The primary heat exchanger 18 can be of the shell-and-tube type. In this case, the use of turbulators is preferred. Turbulators are devices to turbulate (i.e., increase turbulence) and rapidly mix the liquid or the liquid/gaseous mixture, thereby transporting heat throughout the mixture and reducing fouling inside the tubes. FIG. 3 depicts an elevation view showing a shell-and-tube primary heat exchanger with turbulators inside the tubes. FIGS. 3a, 3b, 6a and 6b show turbulators 53, 54, and 55 inside the tubes 42. The tube side of the heat exchanger is shown above and below the tubes 42 as well as inside the tubes 42. The shell side of the primary heat exchanger 18 is shown outside the tubes 42. The turbulence-enhancing devices 53, 54, and 55 can take a number of forms.

Examples include static mixers 53 (more fully described in U.S. Pat. No. 4,670,103, incorporated herein by reference), chains 55, or metal strips with twists 54 or protuberances designed to produce turbulence at the recirculation rate of the

TABLE 1

| | |
|---|---|
| 101 | PUMP 2" INLET X 1" OUTLET FLANGED SS |
| 102 | BASKET STRAINER 1" FLANGED CPVC |
| 103 | BASKET STRAINER 1" FLANGED CPVC |
| 104 | SECONDARY HEAT EXCHANGER 2" FLANGED SS |
| 105 | BLOWER 6" FLANGED CAST IRON |
| 106 | PRIMARY HEAT EXCHANGER 6" FLANGED SS |
| 108 | STEAM TRAP 2" FLANGED CAST IRON |
| 109 | (2) CLEAN IN PLACE SPRAY NOZZLES SS |
| 110 | (1) FULL COVERAGE SPRAY NOZZLE SS |
| 111 | PLATE-PAK 12" THK IN 3 SECTIONS SS |
| 112 | MIST ELIMINATOR 6" THK IN 3 SECTIONS SS |
| 113 | SIGHT GLASS 4" FLANGED SS |
| 114 | VORTEX BREAKER FITS INSIDE 6" PIPE SS |
| 115 | PUMP 6" INLET x 4" OUTLET FLANGED SS |
| 117 | INVERTED CONE STRAINER 8" FLANGED SS |
| 119 | AIR COMPRESSOR CS |
| 120 | BOILER CS |
| 121 | MOTOR STARTER AND VFD PANEL CS |
| 122 | CONTROL PANEL CS |
| CKV101 | SWING CHECK VALVE 1" SW SS |
| CKV102 | SWING CHECK VALVE 1" SW SS |
| FIT101 | FLOW INDICATOR 1" FNPT BRONZE |
| FIT102 | FLOW INDICATOR 1" FNPT BRONZE |
| FS101 | FLOAT SWITCH ½" MNPT SS |
| FV102 | BALL VALVE 3 WAY W/PNEUMATIC ACTUATOR 1" SW SS |
| FV103 | BALL VALVE W/PNEUMATIC ACTUATOR 2" SW SS |
| FV104 | BALL VALVE W/PNEUMATIC ACTUATOR 1" SW SS |
| FV105 | BALL VALVE W/PNEUMATIC ACTUATOR & POSR 2" SW SS |
| HV103 | MANUAL BALL VALVE 1" SW SS |
| HV104 | MANUAL BALL VALVE 1" SW SS |
| HV105 | MANUAL BALL VALVE 1" SW SS |
| HV106 | MANUAL BALL VALVE 1" SW SS |
| HV107 | MANUAL BALL VALVE 1" SW SS |
| HV108 | MANUAL BALL VALVE 1" FNPT SS |
| HV109 | MANUAL BALL VALVE 1" SW SS |
| HV110 | MANUAL BALL VALVE 1" FNPT SS |
| HV111 | MANUAL BALL VALVE 1" SW SS |
| HV112 | MANUAL BALL VALVE 2" SW SS |

TABLE 1-continued

| | |
|---|---|
| HV113 | MANUAL BALL VALVE 1" FNPT SS |
| HV114 | MANUAL BALL VALVE ¾" FNPT SS |
| HV118 | MANUAL BALL VALVE 1" FNPT SS |
| HV119 | MANUAL BALL VALVE ½" FNPT SS |
| HV120 | MANUAL BALL VALVE ½" FNPT SS |
| HV121 | MANUAL BALL VALVE 1" SW SS |
| HV122 | MANUAL BALL VALVE ½" SW SS |
| HV123 | MANUAL BALL VALVE ½" SW SS |
| HV124 | MANUAL BALL VALVE ½" SW SS |
| HV125 | MANUAL BALL VALVE ¾" FNPT SS |
| HV126 | MANUAL BALL VALVE 1" FNPT SS |
| HV127 | MANUAL BALL VALVE ¾" FNPT SS |
| HV128 | MANUAL BALL VALVE 1" SW SS |
| HV129 | MANUAL BALL VALVE ½" FNPT SS |
| HV130 | MANUAL BALL VALVE 1" SW SS |
| HV131 | MANUAL BALL VALVE ½" FNPT SS |
| HV132 | MANUAL BALL VALVE 1" SW SS |
| HV133 | MANUAL BALL VALVE 1" SW SS |
| HV136 | MANUAL BALL VALVE ½" FNPT SS |
| HV137 | MANUAL BALL VALVE 2" SW SS |
| HV138 | MANUAL BALL VALVE 1" FNPT SS |
| HV139 | MANUAL BALL VALVE 6" FLANGED SS |
| HV140 | MANUAL BALL VALVE ½" FNPT SS |
| HV141 | MANUAL GLOBE VALVE 4" FLANGED SS |
| HV142 | MANUAL BALL VALVE 4" FLANGED SS |
| HV144 | MANUAL BALL VALVE 4" FLANGED SS |
| HV145 | MANUAL BALL VALVE 4" FLANGED SS |
| HV147 | MANUAL BALL VALVE 1" FNPT SS |
| HV148 | MANUAL BALL VALVE 1" FNPT SS |
| HV150 | MANUAL GATE VALVE 1" SW SS |
| HV151 | MANUAL BALL VALVE ½" FNPT SS |
| HV153 | MANUAL BALL VALVE ½" FNPT SS |
| HV154 | MANUAL BALL VALVE ½" FNPT SS |
| HV155 | MANUAL BALL VALVE ½" FNPT SS |
| HV156 | MANUAL BALL VALVE ½" FNPT SS |
| HV157 | MANUAL BALL VALVE ½" FNPT SS |
| HV158 | MANUAL BALL VALVE ¾" FNPT SS |
| HV159 | MANUAL BALL VALVE ¾" FNPT SS |
| HV160 | MANUAL BALL VALVE ¾" FNPT SS |
| HV161 | MANUAL BALL VALVE ¾" FNPT SS |
| HV162 | MANUAL BALL VALVE ¾" FNPT SS |
| LS101 | LEVEL SWITCH 1" FLANGED SS |
| MCV101 | AIR VENT ¾" FNPT CS |
| MCV102 | AIR VENT ¾" FNPT CS |
| MCV103 | AIR VENT ¾" FNPT CS |
| PI101 | PRESS. GAUGE W/DIAPHRAGM ?-? PSIG ½" MNPT SS |
| PI102 | PRESS. GAUGE W/DIAPHRAGM ?-? PSIG ½" MNPT SS |
| PI103 | PRESS. GAUGE W/DIAPHRAGM ?-? PSIG ½" MNPT SS |
| PI104 | PRESS. GAUGE W/DIAPHRAGM ?-? PSIG ½" MNPT SS |
| PI105 | PRESS. GAUGE W/DIAPHRAGM ?-? PSIG ½" MNPT SS |
| PI111 | PRESS. GAUGE W/DIAPHRAGM ?-? PSIG ½" MNPT SS |
| PI112 | PRESS. GAUGE W/DIAPHRAGM ?-? PSIG ½" MNPT SS |
| PI113 | PRESS. GAUGE W/DIAPHRAGM ?-? PSIG ½" MNPT SS |
| PR101 | PRESS. REGULATOR ¼" FNPT PVC |
| PS101 | PRESS. SWITCH ½" MNPT SS |
| PS102 | PRESS. SWITCH ½" MNPT SS |
| PS103 | PRESS. SWITCH ½" MNPT SS |
| PS104 | PRESS. SWITCH ½" MNPT SS |
| PS105 | PRESS. SWITCH ½" MNPT SS |
| PS106 | PRESS. SWITCH ½" MNPT SS |
| PSV101 | VACUUM BREAKER 1" MNPT SS |
| PSV102 | SAFETY VALVE 3" FLANGED CS |
| SV101 | SOLENOID VALVE ½" FNPT BRASS |
| TC101 | THERMOCOUPLE W/WELL ¾" MNPT SS |
| TC102 | THERMOCOUPLE W/WELL ¾" MNPT SS |
| TI101 | TEMPERATURE GAUGE ?-? DEG. F. ½" MNPT SS |
| TI102 | TEMPERATURE GAUGE ?-? DEG. F. ½" MNPT SS |
| TI103 | TEMPERATURE GAUGE ?-? DEG. F. ½" MNPT SS |
| TI104 | TEMPERATURE GAUGE ?-? DEG. F. ½" MNPT SS |
| TI105 | TEMPERATURE GAUGE ?-? DEG. F. ½" MNPT SS |
| TI108 | TEMPERATURE GAUGE ?-? DEG. F. ½" MNPT SS |
| TSH101 | THERMOSWITCH SET AT ? DEG. F. ½" MNPT SS |
| THS102 | THERMOSWITCH SET AT ? DEG. F. ½" MNPT SS |
| XJ101 | EXPANSION JOINT 6" FLANGED SS |
| XJ102 | EXPANSION JOINT 6" FLANGED SS | liquid. The turbulators 53, 54, and 55 may be mounted inside the tubes 42 in a fixed manner or may be suspended from the top of the tube sheet or otherwise loosely mounted so they will vibrate or rattle in the turbulent liquid flow. Mounting the turbulators 53, 54, and 55 so that they rattle against the interior sides of the tubes 42 is preferable to inhibit scale formation on the interior sides of the tubes 42. In addition, such mounting helps to break up the laminar flow of the liquid which would otherwise form along the inside surfaces of the tubes, allowing for turbulent flow close to the tube sides. In this manner, the turbulent flow enhances the heat transfer from the exterior of the tube on the shell side of the heat exchanger 18 through to the liquid in the tubes on the tube side of the heat exchanger 18.

Figure 3A:
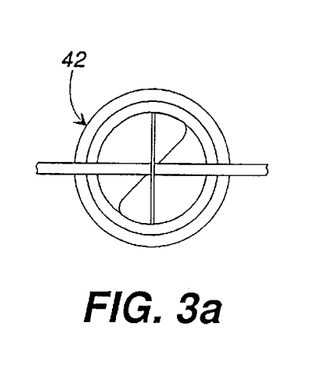
FIG. 3a is a plan-view diagram showing one of the tubes depicted in FIG. 3 with its turbulence-enhancing device inside.
Figure 3B:
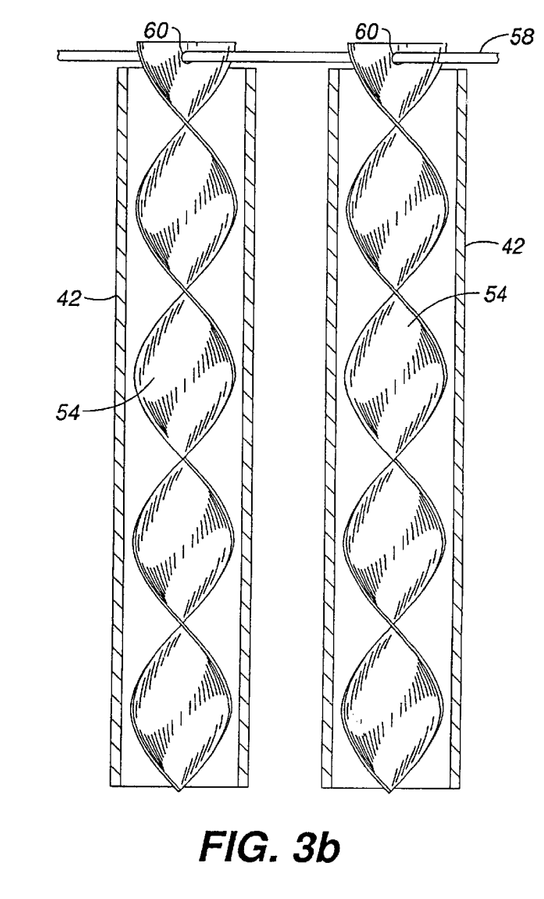
FIG. 3b is a partial elevation-view diagram showing a preferred method of hanging the turbulence-enhancing devices inside two of the tubes depicted in FIG. 3.

FIG. 3a shows, in plan view, one of the turbulators 54. It is a twisted sheet-metal helix just smaller than the inside diameter of a tube 42. In a preferred design, the tubes are 0.75 inch cylindrical tubes 80 inches long, extending 0.5 inch below the bottom of the tube sheet. The helixes are 18-gauge stainless steel, twisted 360 degrees approximately every 18 inches. As shown in FIG. 3b, the turbulators 54 may be mounted loosely by drilling a hole 60 in the top of each turbulator 54, threading a rod 58 (stainless steel) through all turbulators 54 in tubes 42 that form a straight line in the evaporator, and resting the rod 58 on the upper tube sheet. Such a mounting allows the turbulators 54 to rattle against the side walls of the tubes 42 and facilitates removal of the devices for cleaning.

It is preferable that the turbulators do not take up a significant portion of the volume of the tubes 42 (preferably less than 10% by volume), thereby minimizing both the volume displacement and the frictional loss of the circulating liquid.

The primary heat exchanger can also be a spiral type or a plate type, of the form and structure well known in the art.

Figure 4A:
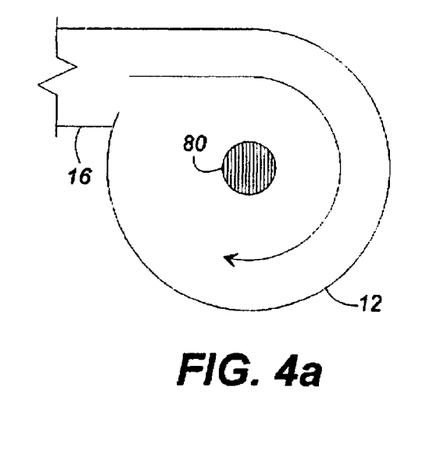
FIG. 4a is a cross section view of the evaporation vessel, taken along line 4—4 of FIG. 1.
Figure 4B:
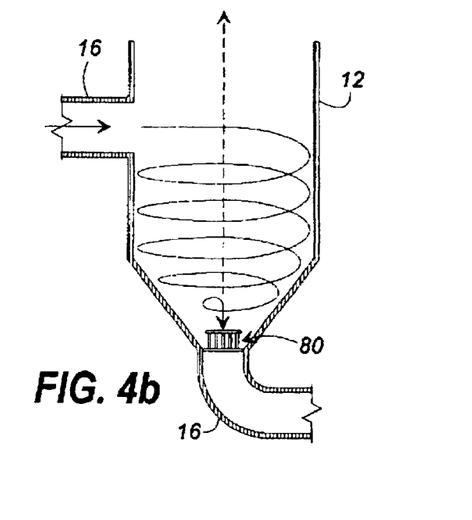
FIG. 4b is a diagrammatic elevation view of the lower portion of the evaporation vessel, showing the cyclonic flow of the liquid to be evaporated.

FIG. 4a is a cross section view of the evaporation vessel, taken along line 4—4 of FIG. 1. This view shows the connection of the evaporation loop 16 to the periphery of the evaporation vessel 12 in a tangential manner so that a swirling, vortex action is induced by the entry of the circulating liquid into the evaporation vessel 12. The vortex action and cyclonic flow is shown in FIG. 4b. A vortex breaker 80 is located at the bottom of the evaporation vessel 12 at the transition to the evaporation loop 16.

Similarly, the degasser 70 operates by vortex action. To accomplish this, the vapor compression outlet line 36 is connected to the periphery of the degasser 70 in a tangential manner so that a swirling, vortex action is induced by the entry of the circulating liquid into the degasser 70. Non-condensable gasses build up pressure and a pop-off valve (not shown) located at the bottom of the degasser releases the gasses heavier than the vapor as the pressures builds above a pre-selected set point.

Figure 5:
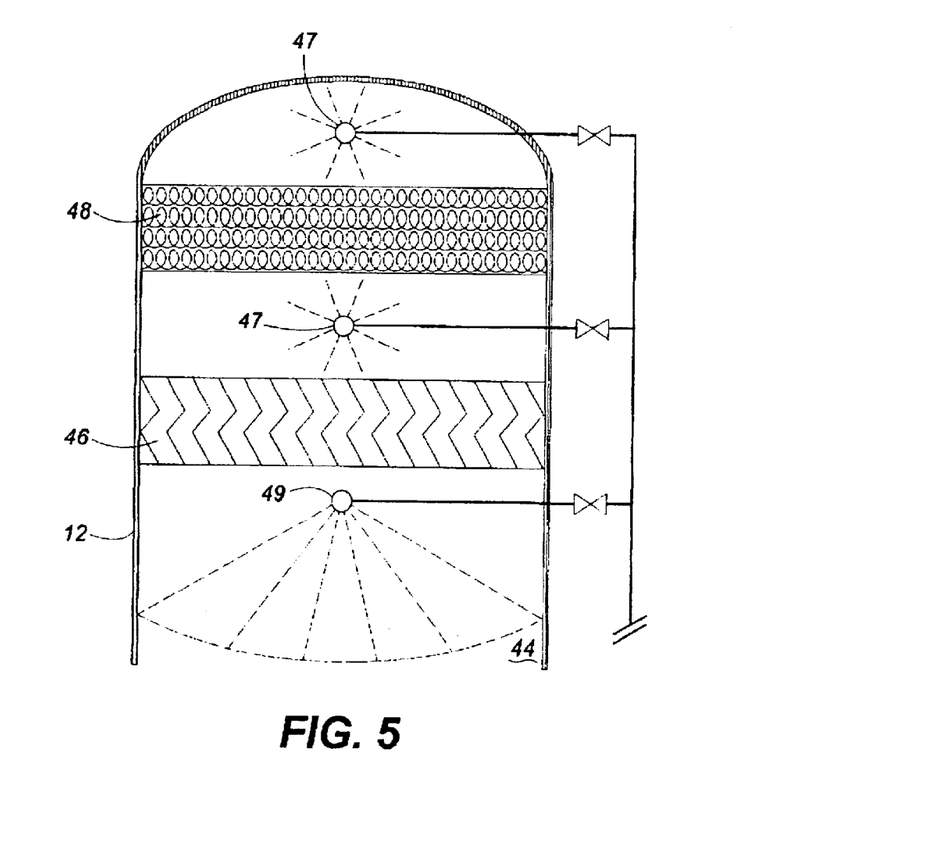
FIG. 5 is an elevation view of the interior components of the upper portion of the evaporation vessel.
Figure 6A:
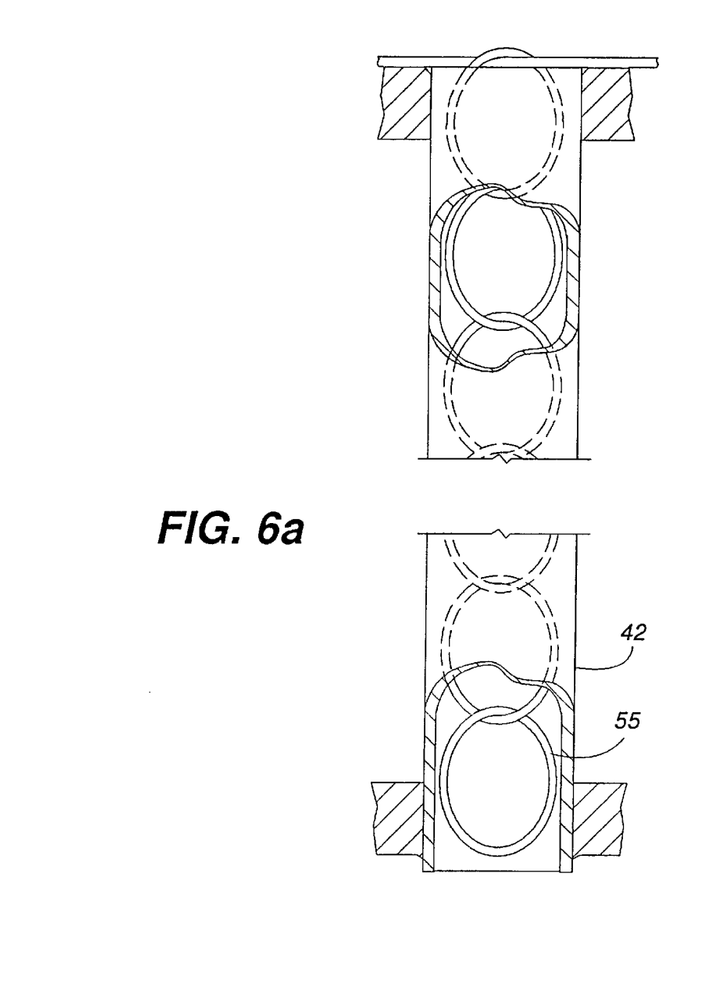
FIG. 6a is an elevation-view diagram showing a chain as a turbulence-enhancing device.
Figure 6B:
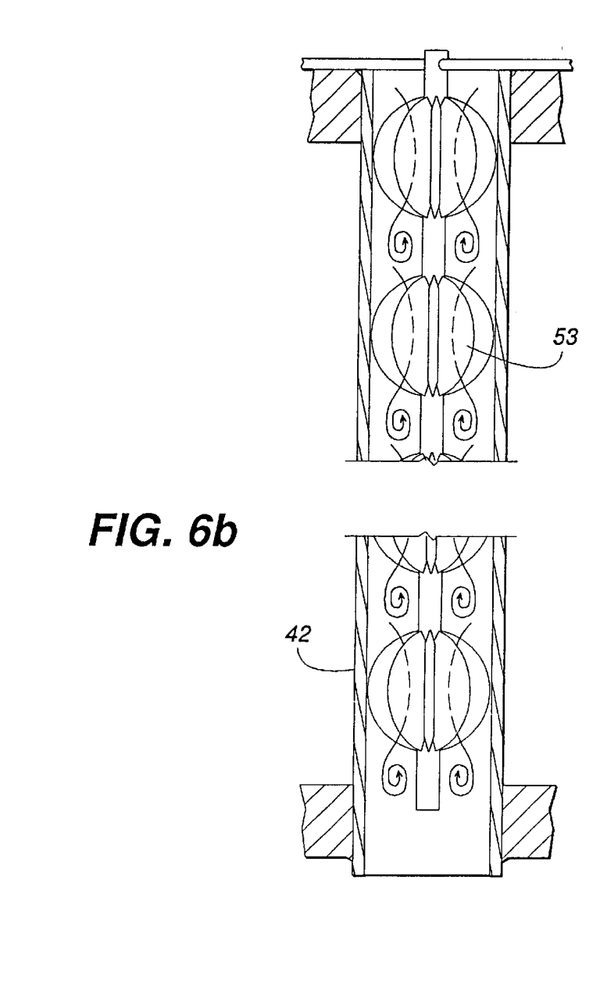
FIG. 6b is an elevation-view diagram showing a static mixer as a turbulence-enhancing device.

FIG. 5 is an elevation view of the interior components of the upper portion of the evaporation vessel. This view shows the vapor disengagement section 44 above the level of the liquid being evaporated. If used, full spray nozzles 49 spray liquid or other suitable liquid into the vapor disengagement section to assist the disengagement of the vapor from mist and other liquid droplets. A plate pack mist eliminator 46 with steam scrubbing nozzle 47 and demister pads 48 with steam scrubbing nozzle 47 are placed above the full spray nozzles 49.

Operation. Vapor that is liberated from the boiling pool in the evaporation vessel 12 is evacuated through a corrugated plate style mist eliminator 46 followed by a demister pad style mist eliminator 48. Spray nozzles 49 are installed below the corrugated plate mist eliminator to be optionally used for introduction of chemical defoamer or for simple impingement liquid scrubbing of the liberated vapor. The nozzles are flow rated at 5% of the designed evaporation rate.

Vapor evacuation is imposed upon the vessel by a positive displacement rotary lobe vapor blower. Saturated vapor at approximately 0–2 psig is evacuated from the evaporation vessel and recycled through the blower to apply its latent heat to the incoming feed liquid within the primary heat exchanger 18. In the process, the blower 10 imparts an approximate 5 psig differential pressure rise to the vapor prior to reintroduction of the vapor into the hot side of the primary heat exchanger. The blower is supplied with an automatically operated by-pass line 50 to regulate the pressure in the evaporation vessel 12. If the pressure on gauge 45 falls below 1.5 psig, valve 51 is fully opened. As the pressure rises, a signal from the gauge 45 controls a modulated closing of valve 45 from fully open at 1.5 psig to fully closed at 2.0 psig.

As the vapor gives up its latent heat to the incoming feed liquid in the primary heat exchanger 18, it cools to slightly below the boiling point. Still pressurized by the recycled vapor, the distillate exits the primary heat exchanger through a vapor trap 78 and is transferred to a secondary heat exchanger to partially preheat the incoming feed liquid. Final distillate exist the system at approximately 120–140 degrees Fahrenheit.

The heat recovered and recycled is approximately 95% of the heat required for atmospheric evaporation, therefore; make-up heat and heat required for initial start-up can be supplied in the form of steam. This make-up steam is supplied through a modulating valve, controlled with a temperature controller and indirectly introduced into the recirculation loop or into the evaporation vessel 12 through a sparger.

The feed rate of the feed liquid is regulated to match the evaporation rate via a level sensor 66 housed in a stand pipe 52 external to the operating evaporation vessel. The level sensor 66 is used to measure the liquid level of the boiling pool and to control the feed pump 56. As the pool evaporates, the liquid level drops. Once the level reaches a low level point, the two-way valve 62 is activated to provide additional feed liquid to the evaporation loop 16 and the level of the pool rises until a high level point deactivates the two-way valve 62. This procedure continuously cycles within an approximate level differential of two (2) inches in the standpipe 52.

As 80–98% of the feed liquid is typically evaporated and recovered as distillate, contaminants are continuously recirculated and concentrated within the evaporation vessel. Concentrate is evacuated from the evaporation loop 16 through a slip stream controlled by a valve 37 activated by a timer. The timer is adjustable for regulating the duration and repetition of the valve sequence. The maximum amount of concentrate removed in a single purging cycle is determined by the liquid level of the boiling pool. When the low liquid level switch is reached, it closes the concentrate valve and resets the timer. The timer will then begin a new count down until it initiates another concentrate removal cycle.

The operational parameters of the distiller are chosen so as to maintain a liquid, rather than a gaseous, flow throughout the primary heat exchanger 18. This is done by maintaining the recirculating flow rate at a value 25 to 200 times the feed rate of the liquid to be evaporated. The feed pump 56 has a variable speed drive which can vary the heat recovery of the secondary heat exchanger. In one embodiment, the variable speed drive is rated from 0 to 7 gal/min and is operated at 4 gal/min, or approximately 6000 gallons per day. The recirculation pump 40 is a 5 hp unit, operated at 20 psig to produce 200 gal/min. The recirculation pump rate is preferably controlled manually by reading a pressure gauge on the output side of the recirculation pump 40 and by adjusting a flow control valve to achieve the proper operational pressure. Transfer of heat from the compressed vapor may result in local boiling of the liquid inside the evaporation loop 16 above the primary heat exchanger 18. The recirculation rate is fast enough to entrain the vapor bubbles in the liquid in the primary heat exchanger 18 and to maintain a turbulent-flow, single liquid phase throughout the primary heat exchanger 18, thereby increasing the heat transfer to the recirculating liquid.

At start up, the evaporation vessel is filled with raw feed liquid until the feed liquid applies an appropriate head pressure for the recirculation pump 40. In one embodiment, this is approximately 35–45 inches above the center line of the recirculation pump 40. The recirculation pump 40 is started and steam is introduced live into the system. The temperature of the liquid in the evaporation vessel is raised until there is positive pressure (up to 3 psig, preferably between 1 and 2 psig) on gauge 45 in the vapor disengagement section 44. At this point a high temperature cut-off point and a lower temperature turn-on point can be set for temperature readings on a temperature sensor in the boiling pool in the evaporation vessel 12. The temperature settings can thereafter be used to manually or automatically control the introduction of make-up steam to operate the evaporator. With a positive pressure in the vapor disengagement section 44, the blower or compressor 10 is turned on. This causes a slight drop in pressure, which thereafter rapidly rises as heat is applied to the hot side of the primary heat exchanger 18. Operating the evaporator at a positive pressure in the vapor disengagement section 44 minimizes physical carry-over of the feed liquid which otherwise would deleteriously affect the quality of the distillate.

The advantages of the invention include improved heat transfer by rapid turbulent flow of liquid through the inside of the primary heat exchanger provided by one or more high volume recirculation pumps. Turbulators placed inside the primary heat exchanger (when it is a shell-and-tube type) can also be used to increase the liquid turbulence at the inside walls of the heat exchanger. This also dramatically reduces or stops fouling inside the heat exchanger.

Increased flexibility of addition of steam for either startup or as makeup heat is provided by allowing for the addition of makeup steam to compensate for distiller thermal losses. This makeup steam can be added either to the recirculating liquid or directly to the evaporation vessel 12. Direct injection of the steam to the liquid is the most efficient method to transfer the heat but this results in some dilution of the material being evaporated by the condensed steam. If this is not desired, the steam for startup or makeup heat can be fed into the hot inlet 17 of the primary heat exchanger 18.

Additional energy can be conserved by use of a heat exchanger between the hot condensate liquid and the cool incoming feed liquid. Also, if significant amounts of concentrated feed are to be discharged a heat recovery heat exchanger can be used to recover heat from the hot concentrate also.

Accordingly, it can be seen that according to the invention, an improved application of vapor compression evaporation utilizing highly turbulent liquid flow with increased heat transfer on the cold side of the primary heat exchanger surface and the significantly reduced fouling of this surface by highly turbulent flow from both the rapid recirculation of the liquid though the cold side of the primary heat exchanger and by use of the turbulators (shell-and-tube type of primary heat exchanger).

As used herein, the term "steam" means the gaseous phase of the liquid being evaporated, whether the liquid is water or not. Although the description above contains many specifics, these should not be construed as limiting the scope of the invention but as merely providing illustrations of some of the presently preferred embodiments of this invention. Various other embodiments and ramifications are possible within the scope of the invention. For example, this vapor compression distiller can be used to process a wide variety of materials under significantly different conditions while maintaining a highly turbulent liquid flow through the primary heat exchanger which has significantly reduced fouling characteristics. Furthermore, the flexibility in addition of the makeup heat in the form of steam allows for either the more efficient method of heat transfer by direct steam injection into the material being evaporated or by indirect means by feeding this makeup steam into the hot side of the primary heat exchanger. This would have the further benefit in not diluting the material to be evaporated during system startup.

I claim:

1. A vapor compression distillation process, comprising the steps of:
   circulating a liquid with a recirculation pump through an evaporation loop comprising said recirculation pump and an evaporation vessel in fluid communication with a first side of a primary heat exchanger;
   boiling said liquid in said evaporation vessel to produce a vapor;
   collecting said vapor in an upper portion of said evaporation vessel;
   passing said vapor through a vapor compressor to a second side of said primary heat exchanger so as to condense at least a portion of said vapor into a condensate;
   passing said condensate from an outlet of said second side of said primary heat exchanger to an inlet of a first side of a secondary heat exchanger;
   introducing additional amounts of said liquid at a feed rate into a feed loop comprising a feed pump and a second side of said secondary heat exchanger in fluid communication with a feed tank;
   transferring amounts of said liquid from said feed loop to said evaporation loop through a transfer line;
   controlling said amounts of liquid transferred so as to maintain the same volume of liquid in the evaporation loop; and
   wherein said step of circulating the liquid in the evaporation loop is carried out at a recirculation rate of 25 to 200 times the feed rate.

2. The process of claim 1 further comprising the step of turbulating the liquid within said first side of said primary heat exchanger.

3. The process of claim 1 wherein the liquid flows through said first side of said primary heat exchanger without change to the vapor phase.

4. The process of claim 1 wherein the liquid flows through said first side of said primary heat exchanger with change to the vapor phase in at least portions of said first side of said primary heat exchanger.

5. A vapor compression distiller, comprising:
   a primary heat exchanger having a first side thereof which facilitates heat flow to a second side thereof;
   an evaporation vessel for boiling a liquid and collecting the vapor of said liquid in an upper portion of said evaporation vessel;
   a vapor compressor communicating with said upper portion of said evaporation vessel and with an inlet to said first side of said primary heat exchanger;
   a recirculation pump;
   an evaporation loop providing fluid communication from the evaporation vessel through the recirculation pump and through said second side of said primary heat exchanger and back to said evaporation vessel;
   means for boiling the liquid within the evaporation loop;
   a transfer line for supplying the liquid to the evaporation loop at a feed rate;
   wherein said recirculation pump circulates the liquid at a recirculation rate 25 to 200 times the feed rate;
   a secondary heat exchanger having a first side thereof which facilitates heat flow to a second side thereof;
   a condensate line for providing fluid communication between an outlet of said first side of said primary heat exchanger and an inlet of said first side of said secondary heat exchanger;
   a feed pump;
   a feed loop providing fluid communication from the feed pump through said second side of said secondary heat exchanger to said transfer line and back to the feed pump through a feed tank;
   a feed line for supplying said liquid at the feed rate to the feed loop; and
   a control means for setting the feed rate so as to maintain the same volume of liquid in the evaporation vessel.

* * * * *